Aug. 6, 1929.  H. H. LYBRAND  1,723,653
AIRCRAFT CONTROL
Filed Feb. 8, 1927  6 Sheets-Sheet 1

INVENTOR
HORACE H. LYBRAND,
BY
ATTORNEY

Aug. 6, 1929.  H. H. LYBRAND  1,723,653
AIRCRAFT CONTROL
Filed Feb. 8, 1927   6 Sheets-Sheet 3

INVENTOR
HORACE H. LYBRAND,
BY Robert A. Lavender ATTORNEY

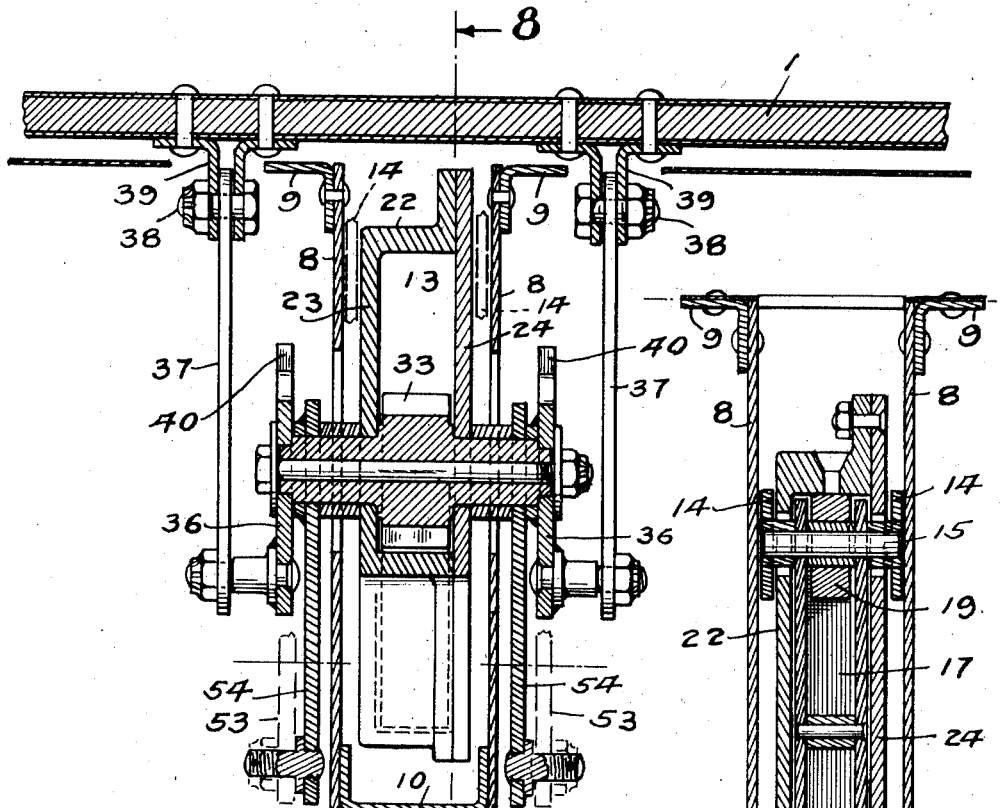
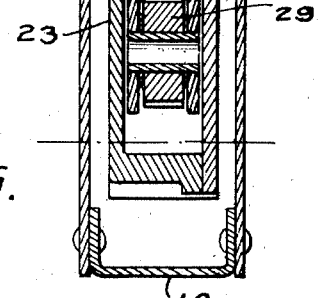
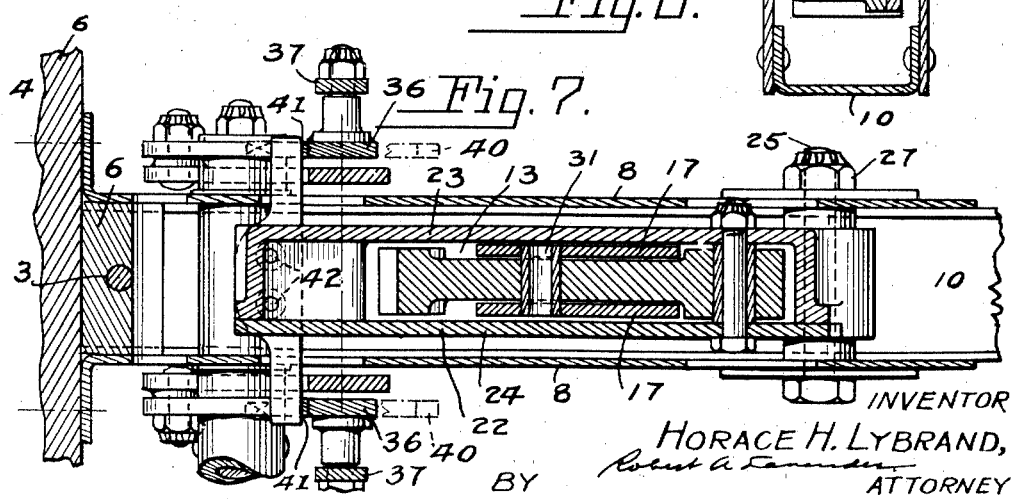

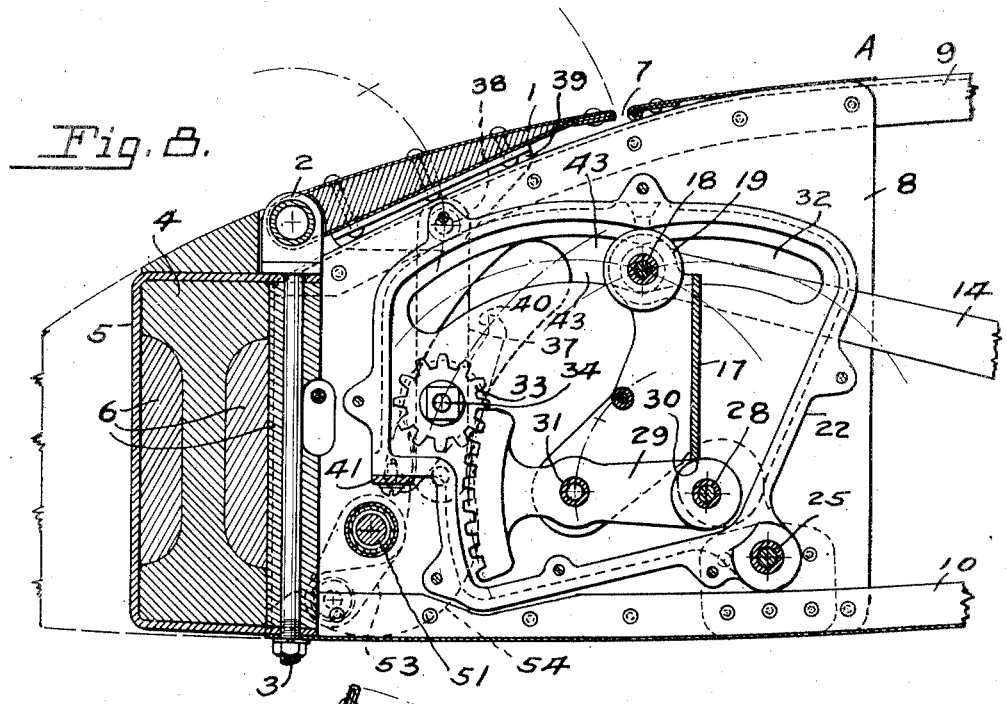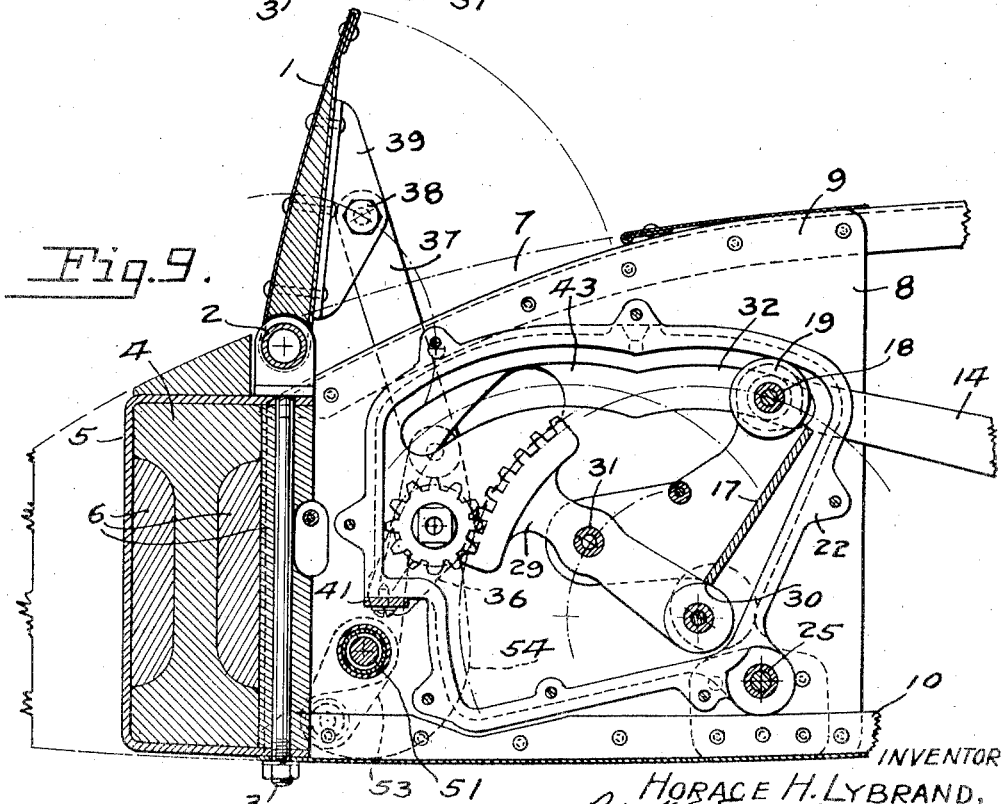

Aug. 6, 1929.  H. H. LYBRAND  1,723,653
AIRCRAFT CONTROL
Filed Feb. 8, 1927   6 Sheets-Sheet 6
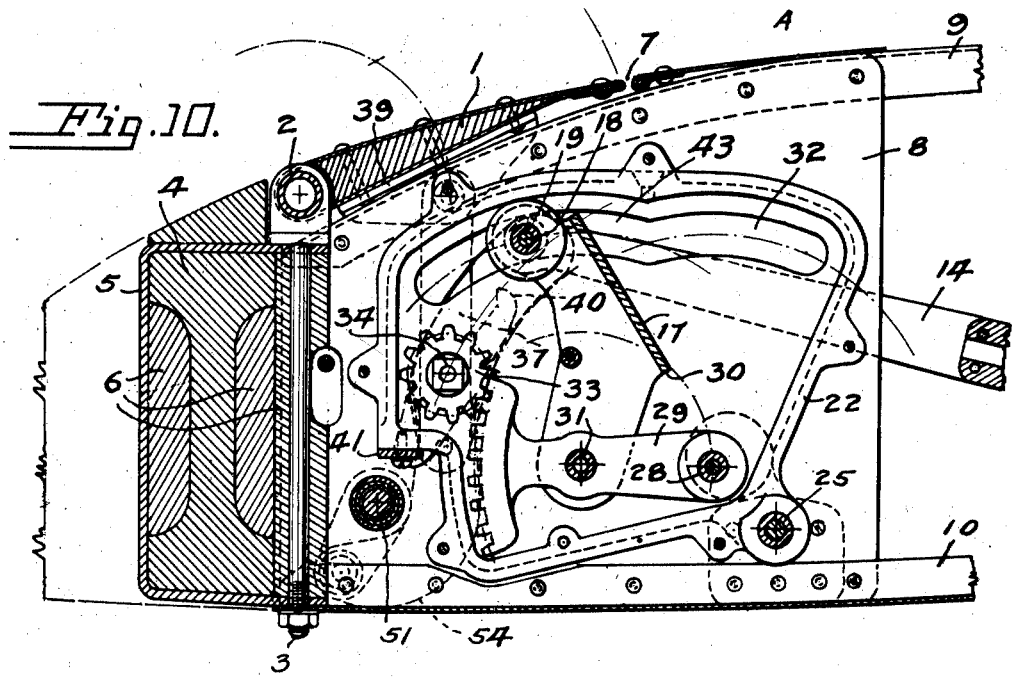
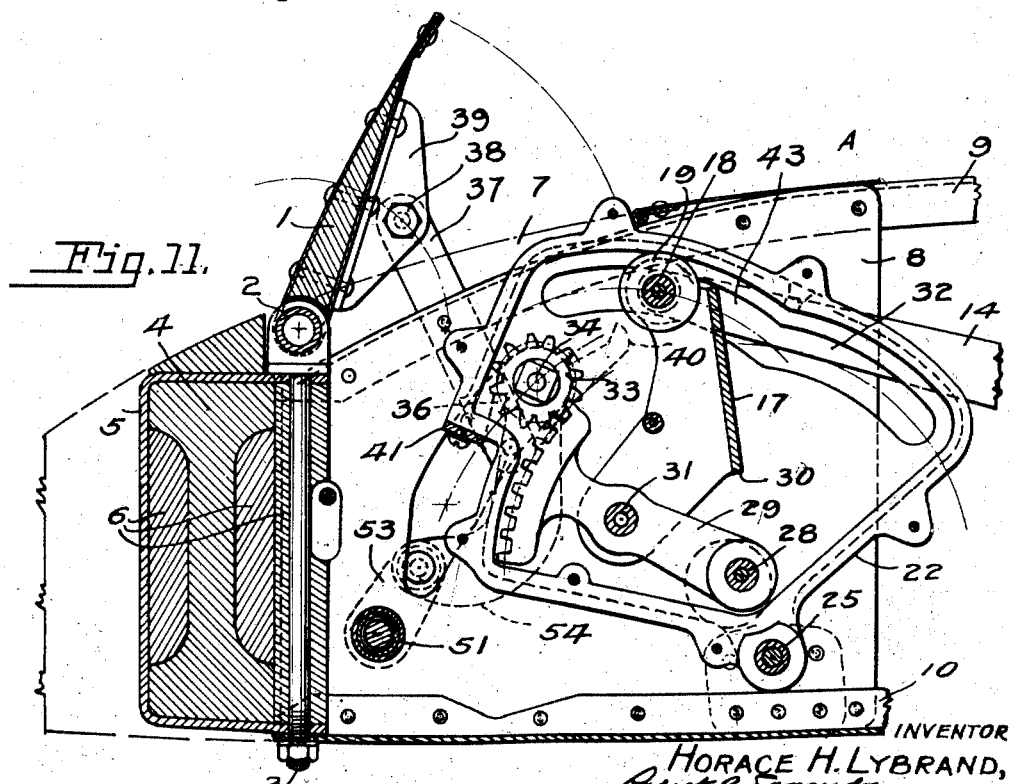
INVENTOR
HORACE H. LYBRAND,
BY
ATTORNEY Patented Aug. 6, 1929.

1,723,653

UNITED STATES PATENT OFFICE.

HORACE H. LYBRAND, OF WASHINGTON, DISTRICT OF COLUMBIA.

AIRCRAFT CONTROL.

Application filed February 8, 1927. Serial No. 166,784.

My invention relates broadly to aircraft control and more particularly to that type of control having flaps in the leading edge of the aircraft wings.

The principal object of my invention is to provide a control device having dependable actuation and effective locking in the various positions of a flap movably engaging and forming a part of an aircraft wing.

Another object of my invention is to provide a mechanism for moving a flap near the leading edge of an aircraft wing when the aileron on that wing is moved out of its neutral position, and a mechanism for locking a flap on the opposite wing against movement, when the latter aileron is moving simultaneously and in a reverse direction to the first mentioned aileron.

Another object of my invention is to provide a mechanism for operating a spoiler by which the lifting power of an aircraft wing is destroyed.

A further object of my invention is to provide mechanisms that will cause alternate movement of the flaps automatically with the movement of ailerons attached to aircraft wings.

A still further object of my invention is to provide means whereby flaps may be controlled from the cockpit of an aircraft independently of the aileron control means.

With the above and other objects in view the invention consists in the construction, combination and arrangement of parts as will be hereinafter more fully described.

Figure 1:
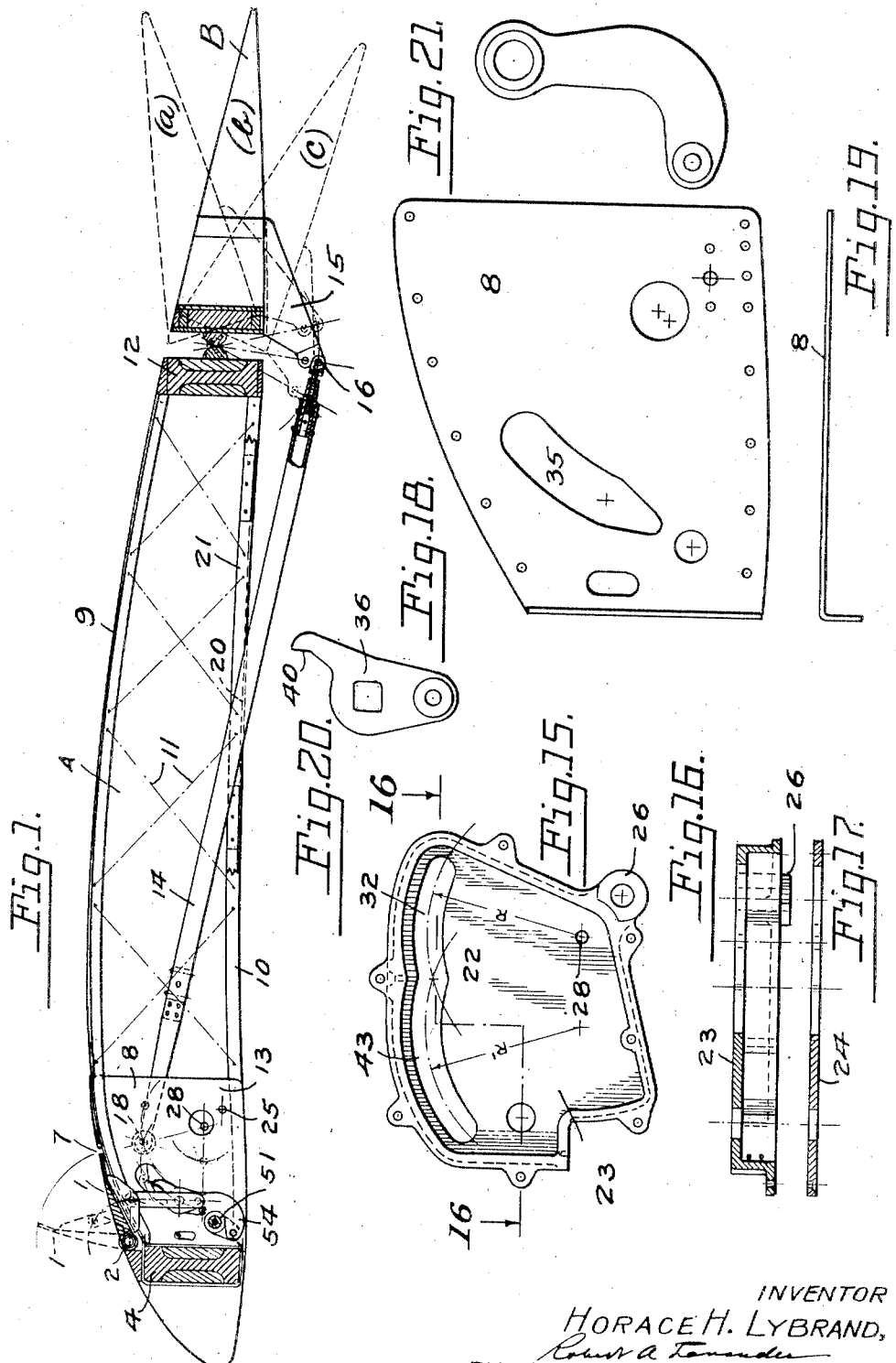
Figure 2:
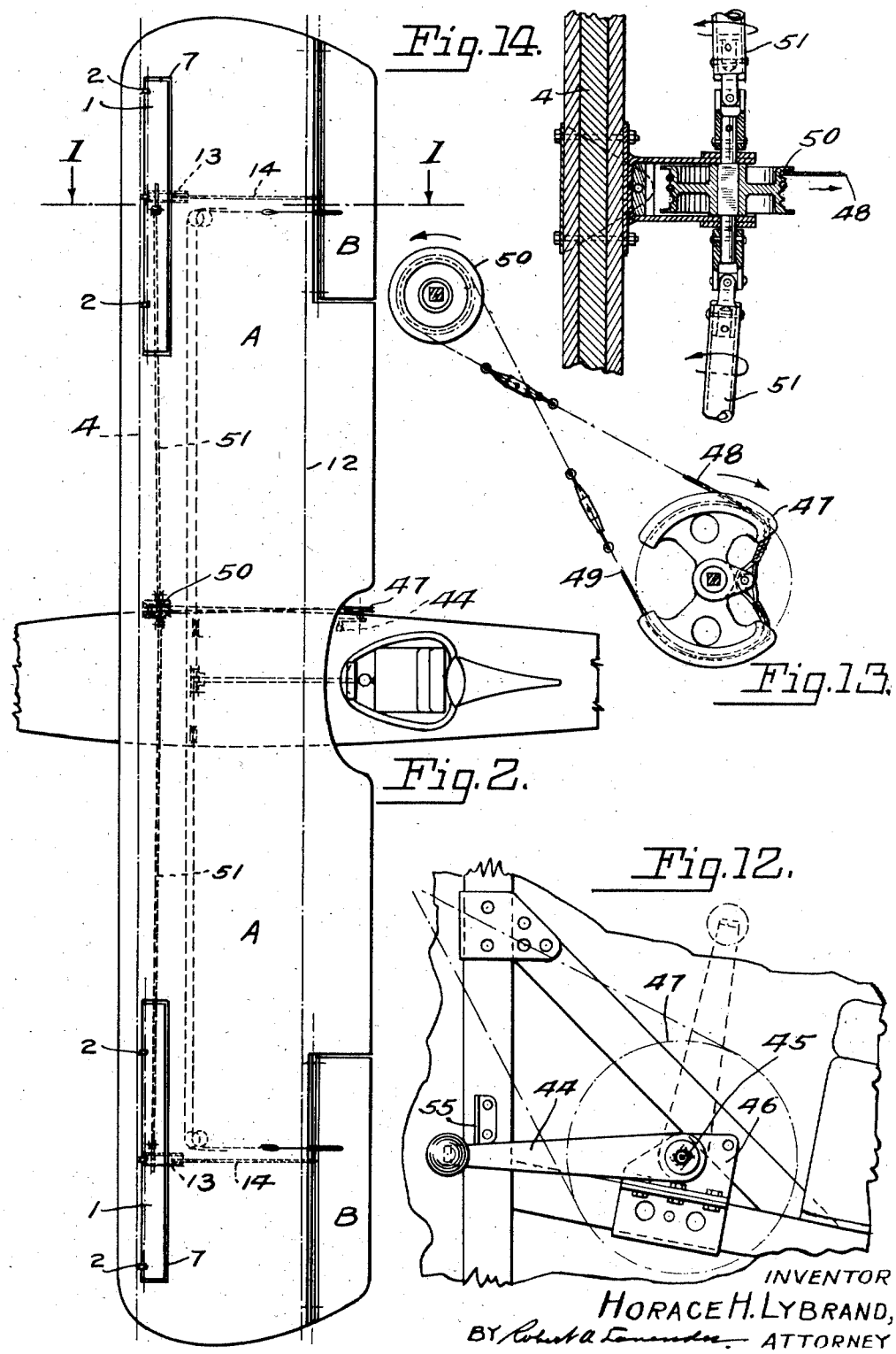
Figure 3:
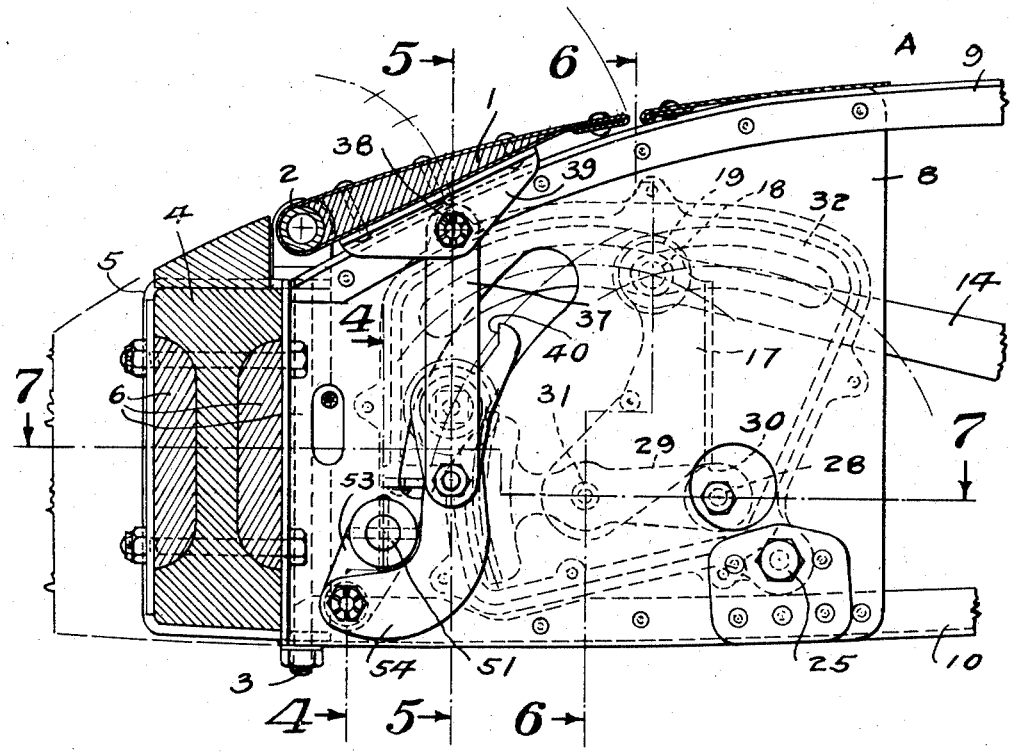
Figure 4:
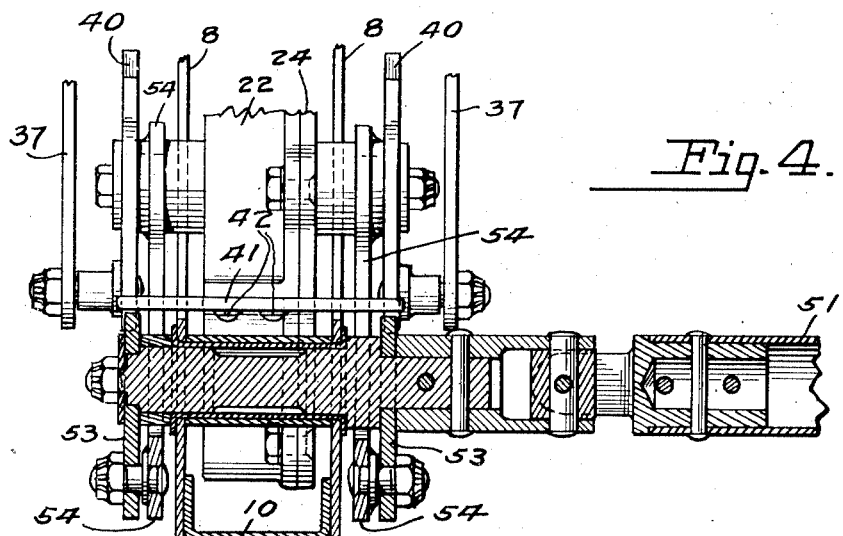

Reference is to be had to the accompanying drawings forming part of this specification, and in which like reference characters indicate corresponding parts throughout the several views, and in which Figure 1 is a vertical section through an aircraft wing showing an embodiment of my invention, Figure 2 is a diagrammatic plan view of a portion of an aircraft showing the arrangement of the aileron control and flap operating mechanism, Figure 3 is an enlarged vertical section through the forward portion of the wing showing the flap operating mechanism partly in full lines and partly in dotted lines, Figures 4, 5, 6, and 7 are detailed sectional views on their respective lines on Figure 3, Figure 8 is a detailed section taken on the line 8—8 of Figure 5, showing the neutral position of a flap operating mechanism. This view illustrates the position of both flap operating mechanisms when the ailerons are in neutral position, as at (b) Fig. 1, Figure 9 is a similar view showing the position of the flap operating mechanisms when one of the flaps is in a raised position, the aileron being in the position (a) Fig. 1, Figure 10 is a similar view showing the position of the flap operating mechanism on the opposite side when that aileron is in a lowered position, as at (c) Fig. 1, Figure 11 is a similar view showing the positions of the flap operating mechanisms when the flaps on opposite sides of the aircraft are raised simultaneously and in the same direction, and independently of the aileron operating mechanism. In this position the housings have been rotated by a separate control means, while the ailerons have remained in neutral position as at (b) in Fig. 1, Figure 12 is a detailed view of the operating lever on the body of the aircraft for moving both flaps simultaneously and independently of the ailerons, Figure 13 is a detailed view of the means for operating the flaps, Figure 14 is a horizontal section of the cable drum located near the center portion of the aircraft wing, Figure 15 is a detailed side view of one of the housing members, with the side plate removed, Figure 16 is a detailed horizontal view taken on the line 16—16 on Fig. 15, Figure 17 is a detailed sectional view of the housing side plate, Figure 18 is a detailed view of one of the fixed side plates for the housing member, Figure 19 is an edge view of Fig. 18, Figure 20 is a detailed side view of one of the lever arms and stop members, and Figure 21 is a detailed side view of one of the connecting links.

Although I will describe but one flap and operating mechanism, it is to be understood that there are two flaps, located at opposite ends of an aircraft wing, or wings, each of which has a like control mechanism operated by respective ailerons, or which may be operated independently of the ailerons.

Referring more particularly to the drawings, A indicates an aircraft wing having a flap 1 located towards the leading edge, hinged at 2 to an eyebolt 3, and secured to the forward spar 4 of the wing by strap fittings 5 and blocks 6. The flap operates in a recess 7 formed in the wing and, when it is in a closed or down position, conforms to the contour of and is flush with the upper surface of the wing. It will be understood, however, that other locations for the flap may be provided.

The flap is controlled by a mechanism operated automatically by the movement of the aileron B or by an independently manually controlled mechanism, to be described later, conveniently located to the pilot. The automatic mechanism is preferably located aft of the forward spar 4 and is mounted between side plates 8 that are secured to the spar 4 and to angle members 9 fastened to the under side of the top surface of the wing, and to channel members 10 fastened to the upper side of the bottom surface of the wing. The members 9 and 10 are stiffened by the usual lattices 11, and extend to the rear spar 12.

The operating mechanism designated as a whole by 13 is provided with a connecting rod 14 that extends aft and is attached to a horn 15 on the lower surface of the aileron B by a bolt 16. The forward end of the connecting rod is forked and is attached to an idler lever 17 by a pin 18 passing through the lever and a roller 19, the pin 18 providing a bearing for the roller. In order to permit the connecting rod to operate centrally in the mechanism, a slot 20, reinforced by angle members 21, is cut in the lower portion of the channel members 10, as may be clearly seen in Fig. 1.

A frame or housing 22, having its rim and one side 23 cast integrally and having a removable side plate 24, is partly filled with lubricant and protects certain moving parts of the mechanism. A pivot for the rotation of the housing, so that the forward end may rise, is formed by a bolt 25 passing through a bearing lug 26 and bearings in the side plates 8, and is held in place by a nut 27.

When the connecting rod 14 travels either fore or aft, it operates the idler 17 that is substantially a U-shaped member pivoted at 28 to sector 29 and is connected at its upper portion to the connecting rod pin 18. When the connecting rod moves aft due to rise of the aileron from the neutral position (b) to the raised position (a) Fig. 1, and the mechanism 13 is moved from the position shown in Fig. 8 to the position shown in Fig. 9, the heel portion 30 of the idler bears against the sector above its pivot point 31 providing a fulcrum, whereby the forward end of the sector is raised. Pressure is caused to be exerted by the heel portion against the sector by the arcuate guideway 32 in the housing 22, and in which roller 19 operates. The sector is provided at its forward end with a geared segment that engages with pinion 33 secured to or made integral with shaft 34 that extends through openings 35 in the side plate 8, and has bearings in the housing 22. Crank arms 36 are secured to shaft 34 at its outer ends in such a manner that they turn with it and are so positioned that when the mechanism is in neutral position their longitudinal axes are perpendicular to the longitudinal axis of the wing proper. Links 37 are pivotally connected at 38 to horn 39 attached to the flap, and also are pivotally attached to the crank arms at their free ends. It will thus be seen that as the connecting rod 14 moves aft it causes the forward end of sector 29 to rise and rotate the pinion 33. As shaft 34, to which pinion 33 is attached, rotates, it carries the crank arms 36 with it, the sweep of the segment permitting them to travel through an arc of 180 degrees, thus bringing the ends of the crank arms that are normally below the shaft to a point above the shaft. The links 37 attached to the crank arms will also be elevated causing the flap to rise. To limit the travel of the sector 29, so that it will not pass beyond the point of engagement with the pinion 33, the crank arms are provided with extensions 40 that engage with stops 41 at the extreme raised of lowered position of the flap. The stop is secured to the housing by suitable fastening elements 42.

While the movement above described is effected by one aileron upon its corresponding flap, the aileron on the opposite side of the wing is travelling downward from its neutral position (b) Fig. 1, but its corresponding flap is to remain in its neutral position. This is accomplished by providing an idling movement for the connecting rod 14 whereby the idler lever 17 does not act to operate the sector, but to the contrary acts to aid in retaining it in its neutral position. As the aileron on this side moves downward, the connecting rod moves forward, as illustrated in Fig. 10. When the flap mechanism is in the position illustrated in Fig. 10, the aileron is in position (c) Fig. 1. During this movement the roller 19 passes from the guideway 32 to a second arcuate guideway 43 extending from and intersecting the first guideway, and carries with it idler lever 17. Guideway 32 is termed active, that is, while the roller 19 is travelling within it, action is imparted to the sector, but while the roller is in guideway 43, it does not influence the sector, and therefore this guideway is termed the inactive or idling. The neutral point for the roller, while the ailerons are in neutral position, is at the intersection of the arcs of the two guideways. The idler is pivoted to sector 29 at 31, and assumes a rocking movement when roller 19 is in guideway 43, and has no direct effect upon the sector except to lock it against movement.

In the above description I have considered only the mechanism for operating a flap for destroying the lift of one wing and momentarily causing the wing with an elevated aileron to spoil the lift of that side of the aircraft sufficiently to effect a maneuver, but when it is desired to make a landing, both flaps may be elevated simultaneously, thereby destroying the lifting effect of both sides of the aircraft and causing them to act as brakes. Both flaps are operated by a manual control easily accessible to the pilot on the cockpit of the aircraft. A lever 44 mounted on a shaft 45 operable in a bearing fitting 46 controls a segment or sheave 47 to which the ends of cables 48 and 49 are attached at a common point. The opposite ends of the cables are crossed and attached to a drum 50 located in the aircraft wing. The drum 50 is secured to torque shafts 51 mounted in bearings in the wing and side plates 8, and is so arranged that when the lever 44, that is normally held in down position by a catch 55, see Fig. 12, is raised, the shafts 51 are rotated, which causes the housing 22 to be raised, elevating both flaps simultaneously. The shafts 51 are out of alignment to enable the sector, or cable sheaves, to be installed within the contour of the wing, and at the same time permit the flap operating mechanism to be closer to the spar.

As shafts 51 rotate, they carry with them crank arms 53 that have links 54 pivoted thereto. The links are also connected to shaft 34 and cause it to be raised in an arcuate path through slot 35 in the side plates 8, Fig. 21. When the shaft is raised, it causes the housing to swing about its pivot bearing in the plates 8, raising the whole mechanism, which elevates the flaps through the links 37.

It will be understood that the above description and accompanying drawings comprehend only the general and preferred embodiment of my invention and that minor changes in details of construction, proportion and arrangement of parts may be resorted to within the scope of the appended claims and without sacrificing any of the advantages of my invention.

Having described my invention what I claim is:

1. In combination with an aircraft wing, a flap pivoted to the upper surface thereof, aileron controlled means for moving the flap, independent manual means for moving the flap, and a guideway and lever operable therein for locking the aileron controlled means.

2. In combination with an aircraft wing, a flap pivoted to the upper surface thereof, aileron controlled means for moving the flap, a means for housing and guiding the aileron controlled means, and means for moving the housing means independently of the aileron controlled means for operation of the flap.

3. In combination with an aircraft wing, a flap pivoted to the upper surface thereof, means for moving the flap means locking said first means in various positions, said locking means comprising a housing, guideways therein, and a lever operable therein, and aileron controlled means for operating said first means.

4. In combination with an aircraft wing, a flap pivoted to the upper surface thereof, means for imparting movement to the flap, means for controlling the movement of the first said means, arcuate guideways for directing the travel of the control means, and aileron controlled means for imparting movement to the control means.

5. In combination with an aircraft wing, a movably mounted flap, means for imparting movement to the flap, means for controlling the movement of the first said means, and means for directing the control means along a path having intersecting arcuate portions.

6. In combination with an aircraft wing, a movably mounted flap, means for imparting movement to the flap, means for controlling the movement of the first said means, and means for directing the control means along a path of intersecting arcuate sections, one of which extends from a center different from that of the other section and being of greater length than the other.

7. In combination with an aircraft wing, a movably mounted flap, a housing, a member pivoted to the housing through which movement is imparted to the flap, a second member pivoted to the first member, arcuate guideways in the housing, a roller attached to the second member and operable within the guideways, and means for imparting movement to the roller to actuate the pivoted member.

8. In combination with an aircraft wing, a movably mounted flap, a housing pivotally mounted in the wing, a member pivoted to the housing through which movement is imparted to the flap, a second member pivoted to the first member, and aileron controlled means for imparting movement to the second member for operating the first member.

9. In combination with an aircraft wing, a movably mounted flap, a housing, arcuate guideways therein, a member pivoted to the housing, a gear engageable with said member, links connecting the gear and flap, a second member pivoted to the first member and operable within the guideways, and means for imparting movement to the second member.

10. In combination with an aircraft wing, a movably mounted flap, a housing, a member pivoted to the housing and imparting movement to the flap, a tortuous guideway in the housing, a second member pivoted to the first member and operable within the guideway, and means for imparting movement to the second member for operatively swinging the first member.

11. In combination with an aircraft wing, a movably mounted flap, a housing, guideways therein, a member pivoted to the housing for actuating the flap, means directed by the guideways for operating said member, and means independent of the housing guided means for actuating the flap.

12. In combination with an aircraft wing, a movably mounted flap, a housing pivoted within the wing, means pivoted to and directed by the housing for actuating the flap, means for imparting movement to said first means without imparting movement to the housing, and means for pivoting the housing independently for actuating the flap.

13. In combination with an aircraft wing, a movably mounted flap, a movably mounted housing, guideways in the housing, means pivoted to the housing and directed by the guideways for actuating the flap, means for imparting movement to the pivoted means, manually operated means for actuating the flap independently of the said second means, and means in the actuating means for locking the same against undesired movement.

14. In combination with an aircraft wing, a flap movably mounted thereon, mechanism for moving the flap, a movable housing providing shiftable bearings for said mechanism, an aileron, means for connecting the aileron and the mechanism for actuation of the mechanism independently of the housing movement.

15. In combination with an aircraft wing, a flap pivotally connected thereto, a housing, guideways in the housing, a pinion journaled in the housing, actuating means engaging with the pinion, a pivotal support for said means, a lever pivoted to said actuating means and operable in the guideways for moving the flap.

16. In combination an aircraft wing, a flap pivotally carried thereby, a housing, means for imparting movement to the flap, a lever for actuating said means, a guideway in the housing for maintaining the lever in inoperative position, and manual means for independently actuating the flap when the lever is in an inoperative position.

17. In combination with aircraft wings and ailerons, means cooperating with the ailerons for decreasing the lifting power of said wings, means for operating the first said means, a housing, and a guideway in the housing for locking said second means in an inoperative position.

18. In combination with aircraft wings and ailerons, automatic means cooperating with the ailerons for decreasing the lifting power of said wings, means intermediate the ailerons and said means for operating the latter from the former, a housing, and a guideway in the housing for locking said second means in an inoperative position.

19. In an aircraft, wings having movable flaps in the upper forward surfaces thereof and ailerons to the rearward thereof to control the flaps, housings, means within the housings for operating one of the flaps independently of the other while one of the ailerons is moving out of its neutral position, means connecting the ailerons and the first said means, guideways in the housings for holding one of said flap operating means in an inoperative position to maintain another of the flaps in a closed position while the opposite aileron is moving in an opposed direction, and means independent of the aileron control for operating the flaps simultaneously and in the same direction.

20. In an aircraft, wings, flaps pivotally secured thereto, ailerons, pivoted housings, intersecting arcuate guideways in the walls of the housings, sectors pivoted at one end to the housings, levers pivoted to the sector, rollers carried by the levers and operable in the guideways, the levers being adapted to bear against the sectors to raise the free ends thereof when the rollers are in one of the guideways, pinions carried by the housings and engaging with the sectors, rods connecting the ailerons and levers and moving the rollers in the guideways when the ailerons change position, crank arms mounted on the pinion shafts, and members connecting the crank arms and flaps.

21. In an aircraft, wings, flaps pivotally secured thereto, housings, arcuate guideways in the housings, sectors pivotally connected to the housings, pinions engaging the sectors, links connecting the pinions and flaps, levers pivotally connected to the sectors, rollers mounted on shafts carried by the levers and operable in the guideways, and rods connecting the ailerons and roller shafts for actuating the flaps through the levers, sectors, pinions and links.

HORACE H. LYBRAND.